Oct. 3, 1967 R. L. GILLETT 3,345,464

FM STEREO INDICATOR CIRCUITRY

Filed Nov. 9, 1966

INVENTOR.
ROBERT L. GILLETT

BY

Robert E. Strauss
ATTORNEY

United States Patent Office 3,345,464 Patented Oct. 3, 1967

3,345,464

FM STEREO INDICATOR CIRCUITRY

Robert Lee Gillett, Smithfield, N.C., assignor to Sylvania Electric Products Inc., a corporation of Delaware Filed Nov. 9, 1966, Ser. No. 593,126
6 Claims. (Cl. 179—15)

This invention relates generally to stereophonic FM radio receivers, and more particularly to improved circuitry to provide an indication that a stereophonic broadcast is being received.

According to the standards established by the Federal Communications Commission for FM stereo broadcasting, a composite stereophonic signal transmitted by a station consists of a first signal which is the audio sum of a left channel signal plus a right channel signal $(L+R)$, a second signal which is the audio difference of the left and right channel signals, $(L-R)$, and a continuous wave pilot signal. In transmission, the $(L+R)$ signal frequency modulates the FM carrier in a $\pm 15$ kc. band, and the $(L-R)$ signal amplitude modulates a 38 kc. subcarrier. The 38 kc. subcarrier is suppressed such that the $(L-R)$ sideband components thereof frequency modulate the FM carrier in a frequency range above the $(L+R)$ modulation. Since the 38 kc. subcarrier is suppressed during transmission, it is necessary to reinsert at the receiver an appropriate signal to permit demodulation of the $(L-R)$ signal. This is accomplished through the use of the pilot signal which is transmitted as a 19 kc. frequency modulation of the FM carrier. At the receiver, the 19 kc. pilot signal is separated from the $(L+R)$ and $(L-R)$ signal components whereupon the 19 kc. signal is available to provided the synchronized source required for the aforementioned demodulation of the intelligence signals.

The above standards were selected to provide a compatible monaural-stereophonic FM broadcasting system. A monaural FM receiver is able to process the $(L+R)$ signal of a stereophonic broadcast to provide a monaural reception of the broadcast, and a stereophonic receiver is able to process a monaural signal through the $(L+R)$ channel of the receiver for normal monaural reception.

To enable a listener to determine whether a monaural or stereophonic signal is being received, it has become standard practice to utilize the 19 kc. pilot signal, which is present during a sterophonic transmission, but is not present during a monaural transmission, to provide a visual indication that a stereophonic transmission is being received. To accomplish this, a portion of the detected 19 kc. pilot signal is applied to a switching circuit which, when activated by the 19 kc. signal, supplies power to an indicating device, such as a lamp, to thereby provide an indication that a stereophonic signal is being received.

Prior art indicating devices generally are controlled by a transistor responsive to a signal derived from the rectified 19 kc. pilot signal. As an alternative, the transistor is sometimes controlled directly by the 19 kc. pilot signal without rectification. In either event it has been found that variations in the transistor characterisics or variations in the signal applied to the transistor result in variations of the indicator lamp brightness. These undesirable variations in the lamp brightness may be overcome by utilizing well-known control or limiting devices, but such a solution necessarily results in an increase in cost to provide the indicator function.

An additional disadvantage of using transistor control for the indicating device is that the indicating device requres a significant amount of power to provide an adequate brightness lever, whereas transistors are inherently low power devices. Further, the detected 19 kc. pilot signal is a relatively low level signal and therefore must be suitably amplified to provide a signal adequate to drive the control transistor.

Accordingly, it is an object of this invention to provide a stable, economical and simplified circuit capable of providing an indication of the presence of an FM stereophonic signal.

Another object of this invention is to provide an indicator circuit where the brightness of the indicating device is relatively unaffected by variations of the received signal.

A further object of the invention is to provide an indicator circuit having positive turn-on characteristics and requiring a minimum signal to effect turn-on.

These and other objects are achieved in one aspect of the invention by utilizing a latching-type semiconductor device, such as a silicon-controlled rectifier, to control the alternating current power applied to the indicating device, whereby the alternating current power also operates to provide a control function. The latching-type semiconductor device may either be controlled by the unrectified 19 kc. pilot signal or by a rectified 19 kc. signal, thereby providing compatibility with existing systems.

For a better understanding of the present invention, together with other and further objects, advantages, and capabilities thereof, reference is made to the following disclosure and appended claims in connection with the accompanying drawings, in which:

Briefly, a latching-type semiconductor device according to the present invention is a semiconductor device having input, output and at least one gate electrode whereby suitable signals applied to the gate electrode are operative to initiate the flow of current through the device between the input and output electrodes, but thereafter the gate electrode has no control over the operation of the device. That is, signals applied to the gate electrode do not regulate the amount of current through the device, nor can the device be cut-off by way of signals applied to the gate electrode. Typical of this type of semiconductor device are the silicon-controlled-rectifier and the silicon-controlled-switch. For simplicity and ease of understanding, only the silicon-controlled-rectifier will be used in the following detailed description of the invention, but it is to be understood that any latching-type semiconductor device may be substituted therefor and such is intended to be within the teaching and scope of the invention.

Figure 1:
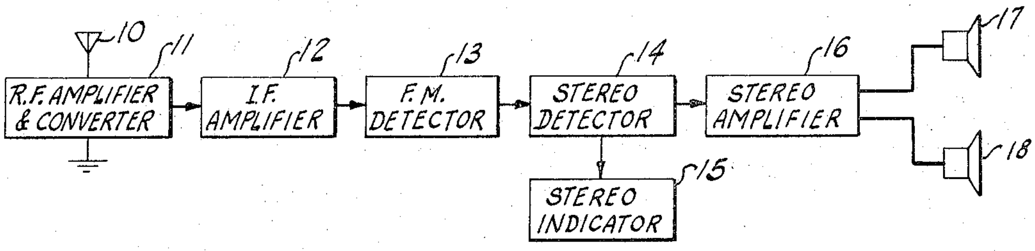
FIG. 1 is a block diagram of an FM stereophonic receiver incorporating the invention.

Referring now to the drawings, the block diagram of FIG. 1 illustrates a typical FM stereophonic radio receiver. An antenna 10 couples the received signal to an RF amplifier and converter 11, where the received signal carrier is heterodyned to produce an intermediate frequency signal. The intermediate frequency signal is amplified by an IF amplifier 12 and fed to an FM detector 13. If the signal received is an FM stereophonic signal, the output of the FM detector contains $(L+R)$, $(L-R)$ and pilot signal components which are applied to the stereo detector 14. In the stereo detector 14, the $(L+R)$, $(L-R)$ and pilot signal components are separated and the pilot signal is doubled in frequency. The 38 kc. signal resulting from the doubling of the pilot signal is then combined with the $(L+R)$ signal and the $(L-R)$ signal to thereby develop pure L and R audio signals. The separate L and R signals are applied to a two channel stereo amplifier 16 the outputs of which drive the speaker system 17 and 18, respectively, to thereby provide the desired stereophonic sounds for listening pleasure. After the pilot signal is separated from the $(L+R)$ and $(L-R)$, a portion of the pilot signal is applied to the stereo indicator circuit 15 which then operates to provide the desired stereo indication. It is to be understood that the signal applied to the stereo indicator circuit 15 may be derived from the 19 kc. pilot signal or from the 38 kc. signal resulting from the doubling of the 19 kc. pilot signal.

Figure 2:
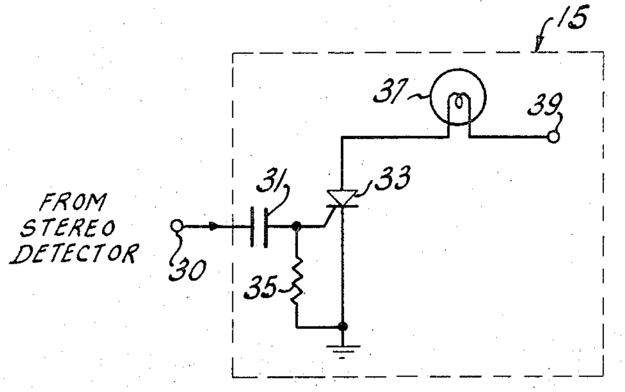
FIG. 2 is a schematic circuit diagram of the stereo indicator circuit of FIG. 1.

Referring next to FIG. 2, there is shown one embodiment of a stereo indicator circuit 15 according to the present invention. The input terminal 30 is connected via a capacitor 31 to the gate electrode of a silicon-controlled-rectifier (hereinafter referred to as an SCR) 33. The cathode electrode of the SCR33 is connected between the gate and cathode electrodes of the SCR. An indicator lamp 37 is connected between the anode electrode of the SCR and a source of alternating-current potential as represented by the terminal 39.

In operation, the SCR33 of FIG. 2 is gated into conduction when there are coinciding positive potentials on the SCR gate and anode electrodes, respectively, and remains conducting as long as the anode voltage is positive with respect to the cathode, even though the polarity of the gate voltage is reversed. That is, once the SCR is gated into conduction, the gate electrode exercises no control over the SCR. The SCR33 cuts-off whenever the positive energizing potential is removed from the anode electrode, i.e., when the anode voltage becomes negative. Therefore, assuming the SCR is initially non-conducting, any positive half-cycle of the 19 kc. pilot signal applied to input terminal 30 places the gate of the SCR33 positive with respect to the cathode and the SCR will conduit if the source of alternating-current potential 39 is in its positive half cycle. Once initiated, the SCR remains conducting until the source of alternating-current potential 39 goes into its negative half at which time the SCR cuts-off. Therefore, as long as the pilot signal is present, the SCR33 will conduct on every positive half-cycle of the alternating-current potential 39, thereby causing the indicator lamp 37 to be illuminated. Because the SCR conducts only during the positive half-cyles of the alternating current source, the rated lamp voltage need be only one-half that of the alternating current source.

Figure 3:
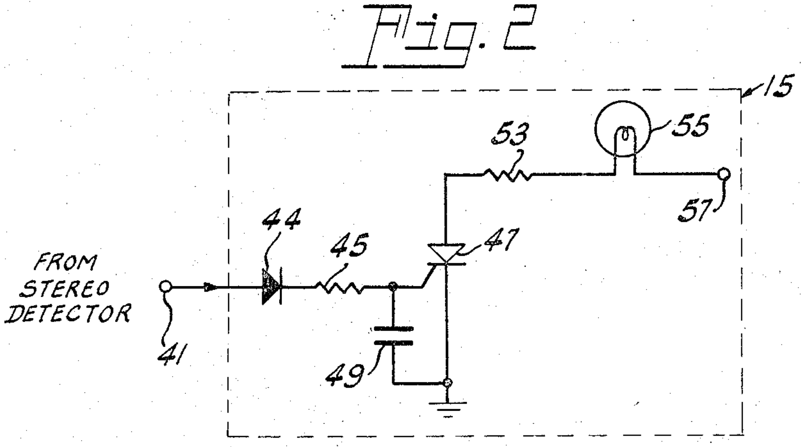
FIG. 3 is a schematic circuit diagram of an alternate embodiment of the stereo indicator circuit of FIG. 2.

The circuit of FIG. 2 may be modified as shown in FIG. 3 to permit direct-current (DC) control of the SCR gating function. According to this embodiment, the pilot signal applied to the input terminal 41 is coupled via a diode 44 in series with a resistor 45 to the gate electrode of the SCR47. A capacitor 49 connected between the gate and cathode electrodes of the SCR47 operates in conjunction with the resistor 45 to develop a positive DC potential from the positive half-cycles of the pilot signal passed by the diode 44. With this embodiment, a positive potential exists at the gate electrode of the SCR as long as the pilot signal is present and the SCR conducts during each positive half-cycle of the alternating current source 51 for the duration of the presence of the pilot signal.

The embodiment of FIG. 3 also illustrates the use of a resistor 53 connected in series with the lamp 55 between the anode of the SCR47 and the source of alternating-current potential 57. The resistor 53 is a protective device which prevents destruction of the lamp 55 if the SCR47 should develop an anode to cathode short circuit, and similarly protects the SCR should the lamp 55 short-out.

The invention as illustrated in FIG. 3 is also susceptible to a combined alternating current and direct current gate control. For example, a source of direct current bias potential may be applied to the input terminal 41 to thereby place a DC potential on the gate electrode of the SCR47. The source of DC potential is chosen such that the SCR will not conduct if the pilot signal is not present, but when the pilot signal is present, the combination of the existing DC potential with the direct current voltage derived from the rectified pilot signal exceeds the gate threshold of the SCR. In this manner, the sensitivity of the indicating device is increased thereby providing indicator operation using lower level pilot signal voltages.

Thus, there has been provided improved stereo indicator circuitry having many advantages over the prior art. By utilizing a positive turn on latching-type semiconductor, the indicator circuitry is simplified and therefore more economical. Also, the positive turn on feature assures a continuous brightness level even though the strength of the received signal may vary. In addition, the indicator circuit of the invention may be controlled directly by signals at the pilot frequency (AC control) or may be controlled by a signal derived by rectifying the pilot signals, thereby providing compatibility with existing systems.

While there have been shown and described what are at present considered preferred embodiments of the invention, it will be obvious to those skilled in the art that various changes and modifications may be made therein without departing from the scope of the invention as defined by the appended claims.

What is claimed is:

1. In stereophonic frequency modulation receivers having a detector of multiplexed stereophonic signals including a pilot signal of predetermined frequency when a stereophonic transmission is received, circuit operative to provide an indication of said pilot signals, said circuit comprising:
   - a latching-type semiconductor device having input, output and gate electrodes;
   - a source of alternating current electrical potential;
   - an indicating device connected between the input electrode of said latching-type semiconductor device and said source of alternating current electrical potential;
   - biasing means connected between the gate and output electrodes of said latching-type semiconductor device;
   - an input terminal adapted to receive said pilot signal of predetermined frequency; and
   - means connecting said input terminal to the gate electrode of said latching-type semiconductor device.

2. The invention according to claim 1 additionally comprising a resistor connected in series with said indicating device between the input electrode of said latching-type semiconductor device and said source of alternating current electrical potential.

3. The invention according to claim 1 wherein said biasing means comprises a resistor connected between the gate and output electrodes of said latching-type semiconductor device, and said means connecting said input terminal to the gate electrode of said latching-type semiconductor device comprises a capacitor connected between said input terminal and the gate electrode of said latching-type semiconductor device.

4. The invention according to claim 1, wherein said latching-type semiconductor device having input, output and gate electrodes is a silicon controlled rectifier having anode, cathode and gate electrodes, respectively.

5. The invention according to claim 1, wherein said biasing means comprises a capacitor connected between the gate and output electrode of said latching-type semiconductor device.

6. The invention according to claim 5 wherein said means connecting said input terminal to the gate electrode of said latching-type semiconductor device comprises a resistor and a diode connected in series between said input terminal and the gate electrode of said latching-type semiconductor device.

References Cited

UNITED STATES PATENTS

| | | | |
|---|---|---|---|
| 3,146,311 | 8/1964 | Wolff | 179—15 |
| 3,306,980 | 2/1967 | Nakamura et al. | 179—15 |

JOHN W. CALDWELL, *Acting Primary Examiner.*

ROBERT L. GRIFFIN, *Examiner.*

UNITED STATES PATENT OFFICE

CERTIFICATE OF CORRECTION

Patent No. 3,345,464 October 3, 1967

Robert Lee Gillett

It is hereby certified that error appears in the above numbered patent requiring correction and that the said Letters Patent should read as corrected below.

Column 1, line 68, for "lever" read -- level --; column 3, line 28, for "conduit" read -- conduct --.

Signed and sealed this 15th day of October 1968.

(SEAL)
Attest:

Edward M. Fletcher, Jr.
Attesting Officer

EDWARD J. BRENNER
Commissioner of Patents